United States Patent [19]
Kishi et al.

[11] 3,853,842
[45] Dec. 10, 1974

[54] ESTERS OF ANTIBIOTICS B-5050 AND TETRAHYDRO-B-5050

[75] Inventors: Toyokazu Kishi, Nara; Setsuo Harada, Osaka; Masayuki Muroi, Osaka; Motoo Izawa, Osaka, all of Japan

[73] Assignee: Takeda Chemical Industries, Ltd., Osaka, Japan

[22] Filed: June 30, 1971

[21] Appl. No.: 158,556

[30] Foreign Application Priority Data
July 2, 1970 Japan................................. 45-58230
Nov. 16, 1970 Japan............................. 45-101329
Dec. 1, 1970 Japan............................. 45-106488

[52] U.S. Cl. ............. 260/210 AB, 195/80, 424/180

[51] Int. Cl. .......................................... C07c 129/18
[58] Field of Search.................. 260/210 AB, 210 R

[56] References Cited
UNITED STATES PATENTS

| | | | |
|---|---|---|---|
| 3,424,743 | 1/1969 | Uzu et al......................... | 260/210 R |
| 3,535,309 | 10/1970 | Hata et al..................... | 260/210 AB |
| 3,669,953 | 6/1972 | Mallams....................... | 260/210 AB |
| 3,699,952 | 6/1972 | Mallams....................... | 260/210 AB |

*Primary Examiner*—Johnnie R. Brown
*Attorney, Agent, or Firm*—Wenderoth, Lind & Ponack

[57] ABSTRACT

This invention relates to pharmaceutically useful esters of antibiotics B-5050 and tetrahydro-B-5050, and a method for producing them.

17 Claims, No Drawings

ESTERS OF ANTIBIOTICS B-5050 AND TETRAHYDRO-B-5050

It has been found by some of the present inventors that a group of new antibiotics is produced by a microorganism belonging to the genus Streptomyces and is accumulated in the culture broth (cf. Belgain Patent No. 754,819). The new antibiotics named as B-5050A, B, C, D, E and F are of macrolide group inhibitory to gram-positive bacteria and represented by the general formula

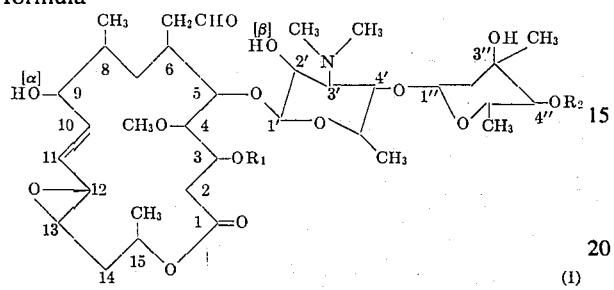

wherein $R_1$ and $R_2$ respectively stand for the following radicals:

|  | $R_1$ | $R_2$ |
| --- | --- | --- |
| B-5050-A | Propionyl | i-Valeryl |
| B-5050-B | Acetyl | i-Valeryl |
| B-5050-C | Propionyl | Propionyl |
| B-5050-D | Acetyl | Propionyl |
| B-5050-E | Propionyl | Acetyl |
| B-5050-F | Acetyl | Acetyl | and has been collectively named as "B-5050" (hereafter in the specification as well as in claims each of these antibiotics and a mixture of two or more of them are collectively referred to as simply B-5050", unless otherwise noted.).

B-5050 has two secondary hydroxyl groups at positions 9 and 2'. Let these two secondary hydroxyl group be simply designated as α- and β-hydroxyl group, respectively in specifications and claims. Then, if one or both of those α- and β-hydroxyl group be esterified selectively, and in one stroke or in stepwise under a certain conditions, the α-monoesters, β-monoesters or α,β-diesters of B-5050 can be produced.

B-5050 also has one unsaturated double bond at position 10, 11 and one epoxy group at positions 12, 13.

It has been found by the present inventors, too, that when the B-5050 is catalytically reduced, the unsaturated double bond is saturated and simultaneously the epoxy group is reductively cleaved to yield the corresponding tetrahydro-B-5050 having a newly formed hydroxyl group at position 13. In the specification as well as in the claims, each of tetrahydro-B-5050 A, B, C, D, E and F, and a mixture of two or more of them are collectively referred to as simply "tetrahydro-B-5050", unless otherwise noted. Tetrahydro-B-5050 is more stable than B-5050 against acids. Tetrahydro-B-5050, thus obtained, has three secondary hydroxyl group at positions 9, 2', and 13, respectively. Thus the formula of Tetrahydro B-5050

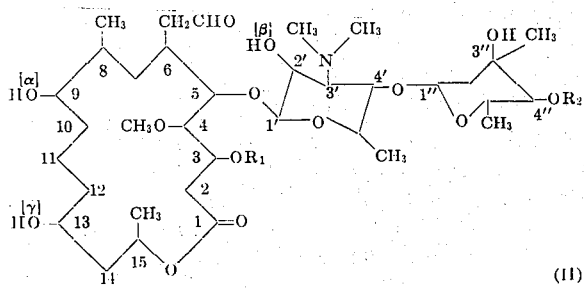

wherein $R_1$ and $R_2$ are as defined above.

Let these three secondary hydroxyl groups be simply designated as α-, β- and γ-hydroxyl groups, respectively in specifications and in claims. Then, if one or more of those α-, β- and γ-hydroxyl groups be esterified, either selectively or non- selectively and in one stroke or stepwise, under certain conditions, the β-monoesters, α, β-diesters, α-, γ-diesters, α-, β-, γ-triesters of tetrahydro-B-5050 can be produced.

These esters of B-5050 and tetrahydro-B-5050 can be recovered directly or by chromatography or other per se conventional means in desired purity and show improved therapeutic effects as disclosed on the following pages.

This invention is the culmination of the above findings.

Thus, the principal object of the present invention is to provide the new and useful esters of B-5050 or tetrahydro-B-5050, collectively, or one or more of a mixture of the members.

Another object is to provide a method for producing said useful esters of B-5050 or tetrahydro-B-5050.

Said objects are realized by reacting B-5050, tetrahydro-B-5050 or α-esters of tetrahydro-B-5050 with an esterifying agent containing an ester group of 2 to 7 carbon atoms derived from an organic acid or an organic carboxylic acid.

Among the starting materials of the present invention, B-5050 is obtained, as disclosed in afore-cited Beligian Patent, by cultivating an antibiotic B-5050 producing microorganism belonging to the genus Streptomyces in a culture medium containing assimilable carbon sources and digestible nitrogen sources under aerobic conditions until antibiotic B-5050 is substantially accumulated in the culture broth, and recovering the accumulated B-5050 therefrom. Among the B-5050 producing microorganisms to be employed in the process aforesaid, there is Streptomyces hygroscopics (IFO 12995) (ATCC 21582) as a typical example.

Another starting material tetrahydro-B-5050 is produced by subjecting the above-mentioned B-5050 to a catalytic reduction which is conventional per se. The antibiotic B-5050 is fat-soluble and, accordingly, soluble in such organic solvents as methanol, ethanol and ethyl acetate. Therefore, when B-5050 is previously dissolved in such a solvent and, then, catalytically reduced with hydrogen gas in the presence of a catalyst such as palladium charcoal, platinum oxide, etc., tetrahydro-B-5050 is obtained in a good yield. The other starting material α-esters of tetrahydro-B-5050 is produced by (1) esterifying B-5050 through a method of the present invention and then (2) subjecting thus-obtained α-esters of B-5050 to a catalytic reduction as mentioned above. It is to be noted that, while B-5050 and esters thereof are catalytically reduced at positions 10 and 12 of formula (I) as described above, they are not affected in any other positions.

In the esterification of this invention, various per se conventional esterifying agents may be employed. The ester group are the residue of organic carboxylic acids which may for example be the groups represented by general formula R·CO-(R means as organic residue) which may be derived from organic acids or the groups represented by the general formula R·O·CO- (R is as defined above) which are formed on removal of hydroxyl radicals from organic carbonic acids and esterifying agents containing such radicals can be employed. While the simplest of such esterifying agents are organic acids as such, the corresponding acid halides and acid anhydrides may also be employed. Among such organic acids are saturated monocarboxylic acids such as acetic acid, propionic acid, n-butyric acid, i-butyric acid, n-valeric acid, i-valeric acid and palmitic acid, unsaturated monocarboxylic acids such as crotonic acid; polybasic acids such as succinic acid; aromatic carboxylic acids such as benzoic acid, p-aminobenzoic acid, etc.; aryl carboxylic acids such as phenylpropionic acid and the like. Among these organic acids, those acids which contain an ester group of 1 to 10, especially 2 to 7 carbon atoms are favorably employed (e.g., acetic acid, propionic acid, n-, i, and tert.-butyric acid, n- and i-valeric acid, crotonic acid, succinic acid, benzoic acid, etc.). Those organic acids may have one or more substituents such as halogen, alkyl, alkoxy, amino, hydroxyl and other groups.

When using such an esterifying agent, it is preferable to employ a solvent which will not adversely affect the esterification reaction, such as pyridine, tetrahydrofuran, acetone which are routinely used as reaction solvents or a mixture of such solvents.

Especially when it is desired to selectively synthesize the $\alpha$-esters, it is advisable to react the starting material with an organic acid halide at about 5°C or a lower temperature in the presence of a reaction solvent such as pyridine, quinoline or picoline. It has been found that by doing so, the $\alpha$-hydroxyl group alone is selectively esterified in a good yield. Therefore, the desired product can be isolated very easily and in a good yield from the reaction mixture without resort to procedures for separating the $\alpha$, $\beta$-ester, $\beta$-ester or/and unreacted starting material.

To synthesize the $\beta$-monoesters, it is desirable to react the starting material B-5050, tetrahydro-B-5050 with an organic acid anhydride or halide at about 5°C or a lower temperature in the presence of such a solvent as acetone, ethyl acetate, methanol or tetrahydrofuran. Incidentally, when it is desired to introduce an aromatic carboxylic acid residue, for example, that of benzoic anhydride, into the position of $\beta$-hydroxyl, the reaction is desirably carried out at about 15°C or a higher temperature in the presence of, for instance, pyridine.

To obtain $\alpha$, $\beta$-diesters, the reaction is preferably conducted at about 15°C or a higher temperature for a longer time (e.g., 10 – 30 hours) than for the production of $\alpha$-esters. For instance, the desired result may be achieved by conducting the reaction overnight in the neighborhood of 20°C.

To synthesize the $\alpha$- $\gamma$-diesters of tetrahydro-B-5050, it is advantageous to react tetrahydro-B-5050 or $\alpha$-esters of tetrahydro-B-5050 with an organic acid halide at about 5°C or a lower temperature in the presence of a reaction solvent such as, for example, pyridine. To synthesize $\alpha$-, $\beta$-, $\gamma$-triesters of tetrahydro-B-5050 from tetrahydro-B-5050 or mono- or di-esters, it is advantageous to conduct the reaction at about 15°C or a higher temperature than for the production of the mono- and di-esters. For instance, $\alpha$-, $\beta$-, $\gamma$-esters may be obtained by carrying out the reaction overnight at about 15°C or a higher temperature.

In case of the production for di- or tri-esters, the esterification procedure can be carried out in two or three steps. By way of illustration, if $\alpha$- or $\beta$-mono esterification is carried out and, then, a further esterification is conducted with the use of a group different from the organic acid residue thus introduced, there will be obtained a diester in which the hydrogen atoms of the $\alpha$- and $\beta$-hydroxyl groups have been replaced by different organic residues.

The various esters of B-5050 or tetrahydro-B-5050 which are obtainable according to this invention can be identified by their shift of NMR signals (100 MC, in CDCl$_3$) as will be seen from the following table.

Table 1

| B-5050 | NMR ($\delta$, ppm) |
|---|---|
|  | 5.66, 6.03 (olefinic proton) |
| esters of B-5050 |  |
| $\alpha$-ester | 4.00 → approx. 5.0 |
| $\beta$-ester | 3.52 → approx. 5.0 |
| $\alpha,\beta$-diester | { 3.52 → approx. 5.0 |
|  |   4.00 |
| tetrahydro-B-5050 | disappearance of olefinic protons |
| esters of tetrahydro-B-5050 |  |
| $\alpha$-ester | 3.9 → approx. 5.0 |
| $\beta$-ester | { 3.5 → approx. 5.0 |
|  |   2.5 → 2.4 |
| $\alpha,\gamma$-diester | approx. 3.9 → approx. 5.0 |
| $\alpha,\beta,\gamma$-triester | { 3.5 → approx. 5.0 |
|  |   3.9 → approx. 5.0 |
|  |   approx. 3.95 → approx. 5.0 |
|  |   2.5 → 2.4 |

Another test is afforded by the fact that whereas the PKa' of B-5050 or tetrahydro-B-5050, which is a basic substance, is approximately 6.6 to 6.9, the PKa' of the $\beta$-esters is approximately 4.7 to 4.8, as shown in Table 2.

Table 2

| B-5050 | PKa' |
|---|---|
|  | approx. 6.9 |
| esters of B-5050 |  |
| $\alpha$-ester | approx. 6.6 |
| $\beta$-ester | approx. 4.7 |
| $\alpha,\beta$-diester | approx. 4.7 |
| tetrahydro-B-5050 | approx. 6.8 |
| esters of tetrahydro-B-5050 |  |
| $\alpha$-ester | approx. 6.6 |
| $\beta$-ester | approx. 4.8 |
| $\alpha,\gamma$-diester | approx. 6.6 |
| $\alpha,\beta,\gamma$-triester | approx. 4.8 |

The various esters which can be obtained according to this invention give different Rf values on thin-layer chromatography and, therefore, the reaction product can be easily fractionated. For instance, when chloroform-methanol is used as a developer solvent system, B-5050, its $\alpha$-propionate, $\beta$-propionate, and $\alpha,\beta$-dipropionate emerge at Rf values of 0.1 – 0.2, 0.37 – 0.52, 0.25 – 0.30, and 0.67 – 0.80, respectively.

If a mixture of B-5050, its $\alpha$-,$\beta$- and/or $\alpha,\beta$- diester is obtained, they may be separated by column chromatography on silica gel or alumina using a solvent system of chloroform-methanol, benzene-acetone or benzene-ethyl acetate, for instance.

The esters of B-5050 and tetrahydro-B-5050 obtainable according to this invention is highly inhibitory to Gram-positive bacteria, in vitro and also, have shown excellent therapeutic effects in experimental infected animal tests.

It has also been found by the assay of their blood concentrations in animals that those esters are efficiently absorbed into the body fluid. Some of those esters have also become more stable against acids than the starting B-5050 and more fat-soluble, thereby lending themselve to the preparation of an ointment.

The following table indicates the improved physicochemical and biological properties of some esters of B-5050 or tetrahydro-B-5050 which are obtained in the method of the present invention.

Table 2

| Compound | Therapeutic effect against Staphylococcus aureus (P.O.) | Blood concentration in rats (P.O.) | Acute toxicity in mice (IP) | stability for acid |
|---|---|---|---|---|
| B-5050(control) | 1 | 1 | 1 | 1 |
| B-5050 α-acetate | 2 times | 2–3 times | ½ | approx. same |
| B-5050 α-propionate | 2–3 times | 2–3 times | ½ | a little more stable |
| B-5050 α-n-butyrate | 2–3 times | 2 times | ½ | 2 times |
| B-5050 α-i-butyrate | 2 times | — | — | 2 times |
| B-5050 α-crotonate | 2 times | — | — | 2 times |
| B-5050 α,β-diacetate | 2 times | 2 times | ½ or less | approxi. same |
| B-5050 α-propionyl-β-acetate | 2 times | — | — | 2 times |
| B-5050 α,β-dipropionate | 2 times | 3 times | ½ or less | 1.5–2.0 times |
| Tetrahydro-B-5050 | 1 | 1 | — | 2 times |
| Tetrahydro-B-5050 α,β,γ-triacetate | 3 times | 3 times | ½ or less | 3 times |
| Tetrahydro-B-5050 α,β, γ-tripropionate | a little stronger | same | | 3 times |

Besides the above-merits, the objective esters in the present invention are more favorable for the per os administration due to the less bitterness in comparison with the starting compounds.

The following references and examples are given to further illustrate this invention, but it is to be understood, however, that the scope of this invention is by no means limited thereto.

The relationship between part(s) by weight and part(s) by volume is the same as that between gram(s) and milliliter(s).

REFERENCE 1

500 ml. each of a pre-seed culture medium (pH 7.0) consisting of glucose (2.0 percent), soluble starch (3.0 percent), soybean flour (1.0 percent), cornsteep liquor (1.0 percent), "Polypepton" (trade name of a casein hydrolyzate, produced by Daigo Nutritive Chemicals, Ltd. Osaka, Japan) (0.5 percent), sodium chloride (0.3 percent), calcium carbonate (0.3 percent) and water is charged in 2000 ml.-Sakaguchi flasks, and sterilized. The sterilized medium is inoculated with a loopful of *Streptomyces hygroscopicus* (IFO-12995) (ATCC 21582) from an agar slant culture which has been cultivated for at least 4 days, and incubated at 28°C on a reciprocal shaker of 115 r.p.m. with 10 cm. stroke for 48 hours. The resulting broth in an amount of 1000 ml. is used as the pre-seed culture.

The pre-seed culture is inoculated into 100 L. of a culture medium (pH 7.0) charged and sterilized in a 200 L-stainless steel tank, the medium consisting of glucose (3.0 percent), cornsteep liquor (0.5 percent), defatted soybean meal (1.0 percent), sodium chloride (0.5 percent), magnesium sulfate (0.05 percent), calcium carbonate (0.3 percent) and water. Incubation is conducted at 28°C with aeration of 100 L. per minute and agitation of 200 r.p. m. for 24 hours.

100 L. of the resulting seed culture is transferred into 1000 L. of a sterilized main culture medium of the same composition as that of the culture medium for seed culture, charged in a 2000 L-stainless steel tank. Incubation is continued at 28°C with aeration of 1000 L. per minute and agitation by impeller of 120 r.p.m. for 66 hours. During the incubation, "Actocol" (trade name of a polyoxypropylene trial mixture of OH number 56, sold by Takeda Chemical Industries, Ltd., Osaka, Japan) is added as antiforming agent at a concentration of about 0.05 percent relative to the whole medium. The culture broth thus obtained exhibits an antimicrobial potency of 350 units in terms of dilution units against Bacillus subtilis as the assay microorganisms.

The broth is filtered. The filtered broth (950 L.) is adjusted to pH 8.5 with a 2N-aqueous NaOH solution, and extracted with ethyl acetate (300 L.). The ethyl acetate layer is separated, washed with water, and extracted twice with 70 L. each of 0.005N-HCl. The aqueous extracts are combined, adjusted to pH 8.5 with diluted aqueous aammonia and again extracted twice with 45 L. each of ethyl acetate. The extracts are washed with water, dehydrated and concentrated in vacuo to 50 ml. To the concentrate is added 750 ml of n-hexane to obtain 95g. of crude powdery Antibiotic B-5050 mixture.

The powdery product is dissolved in 450 ml. of benzene under warming. After the addition of 2g. of activated carbon to the solution being warmed, the mixture is filtered, and the filtrate is allowed to cool on standing to separate 19.0g. of Antibiotic B-5050 mixture as colorless needles.

10 g. of the crystalline Antibiotic B-5050 mixture is dissolved in 50 ml. of ethyl acetate, and is subjected to a column chromatography on silica gel (450g., produced by Merck A.G., Germany, the granular size ranging 0.05 to 0.2 mm.). The charged materials are developed and eluted with a mixture of ethyl acetate and benzene (2 : 1 by volume). The first 600 ml. of the eluate showing antimicrobial activity is concentrated to dryness and the residue is dissolved in hot benzene. On standing, the solution separates 1g. of colorless crystals which consist mainly of Antibiotic B-5050-A.

After the column is eluted with 4 L. of the ethyl acetate-benzene mixture, it is further eluted with 3 L. of ethyl acetate to collect the eluates, which are then concentrated in vacuo to leave a residue. The residue is dissolved in hot benzene. On standing, the solution separates 550 mg. of colorless crystals which consist mainly of Antibiotic B-5050-F.

500 mg. of the crystals consisting mainly of Antibiotic B-5050-A are dissolved in 1.5 ml. of ethyl acetate, and again chromatographed on a column of silica gel (50 g., see above). The charged material is eluted with a mixture of ethyl acetate and benzene (1 : 1 by volume) to obtain fractions. Each fraction is tested for the active ingredients contained, by means of thin layer chromatography on silica gel (sold by Merck A.G., Germany under the name of "$HF_{254}$") with the use of a mixture of benzene and acetone (3 : 2 by volume) as the developer. The fractions which contain solely Antibiotic B-5050-A as the active ingredient are collected, and concentrated in vacuo to leave a residue. On crystallization of the residue from benzene, 88.5 mg. of Antibiotic B-5050 -A is obtained as colorless prisms.

On the other hand, 350 mg. of the crystals consisting mainly of Antibiotic B-5050-F are subjected to a column chromatography on the silica gel (50 g.) in the same manner as above. After the column is eluted with 700 ml. of ethyl acetate-benzene (2 : 1 by volume), it is further eluted with a mixture of ethyl acetate and benzene (3 : 1 by volume), followed by the tests by thin layer chromatography for the active ingredients on each fraction. The fractions which contain solely Antibiotic B-5050-F as the active ingredient are collected, and concentrated in vacuo to leave a residue. The residue is crystallized to obtain 75.6 mg. of B-5050-F as colorless prisms.

REFERENCE 2

In 2 L.-Sakaguchi flasks, 500 ml. each of a sterilized pre-seed culture medium of the same compositions as used in Example 1 is inoculated with *Streptomyces hygrosocopicus* (IFO-12995), and the inoculated flask is incubated in the same manner as in Example 1 to prepare a pre-seed culture.

In 500 L.-stainless steel tank, there is prepared 200 L. of a culture medium of the same composition as used in Example 1 for the seed culture. After being sterilized at 121°C for 20 minutes, the culture is inoculated with 2 L. of the above obtained pre-seed culture. Incubation is effected at 28°C with aeration of 200 L. per minute and agitation of 200 r.p.m. for 24 hours to prepare the seed culture for main fermentation.

200 L. of thus prepared seed culture is transferred into 4000 L. of a main culture medium of the same composition as above, charged in a 6000 L.-stainless steel tank, and the cultivation is conducted at 28°C with aeration of 2400 L. per minute and agitation by impeller of 180 r.p.m. for 48 hours. During the incubation, "Actocol" (see above) is used as an antifoaming agent.

The culture broth is filtered. The filtered broth (4000 L.) is adjusted to pH 9 with 2N-NaOH, and extracted with 1330 L. of ethyl acetate, followed by washing with water to obtain 1052 L. of ethyl acetate extract. The ethyl acetate solution is concentrated in vacuo to 100 L. The concentrated solution is extracted twice with 50 L. each of a M/1.5-aqueous $KH_2PO_4$ solution previously adjusted at pH 4.0 with phosphoric acid. The extracts are combined, adjusted to pH 8.5 with a diluted aqueous ammonia solution, and extracted with 50 L. of ethyl acetate. The ethyl acetate solution is washed with water, dehydrated and concentrated in vacuo to leave a syrup. Addition of 3 L. of n-hexane to the syrup gives 330g. of crude powder. 300 g. of the powder is dissolved in 1.1 L. of benzene under warming, and the solution is allowed to cool on standing to give 117 g. of crystals, which consist mainly of Antibiotics B-5050-C, -D and -E. (Crystal I).

On the other hand, the ethyl acetate layer which was extracted with the phosphate solution is further extracted twice with 50 L. each of N/200 $H_2SO_4$, and the aqueous layers are combined, adjusted to pH 8 with a diluted aqueous ammonia solution and extracted three times with 30 L. each of ethyl acetate. The ethyl acetate extracts are combined, washed with water, dehydrated and concentrated in vacuo to leave a syrup. Addition of 1.5 L. of n-hexane to the syrup gives 160 g. of a crude powder. 150 g. of the powder is crystallized from hot benzene to give 72.5 g. of crystals, which consist mainly of Antibiotic B-5050-A and -B together with a small amount of Antibiotic B-5050-C (Crystal II).

2.0 g. of Crystal II is dissolved in 20 ml. of ethyl acetate, followed by the addition of 14 ml. of benzene. The solution is subjected to column chromatography on silica gel (Merck A.G., Germany, granular size ranging from 0.05 to 0.2 mm.) which is previously filled with an equivolume mixture of benzene and ethyl acetate. The chromatogram is developed firstly with ethyl acetate-benzene (1 : 1 by volume) to collect 200 ml. of the eluate, then with ethyl acetate-benzene (3 : 2 by volume) to obtain fractions exhibiting antimicrobial activity against Bacillus subtilis. The fractions of the same ingredient are respectively combined, concentrated and crystallized from benzene to give 435 mg. of crystals of Antibiotic B-5050-A, on one hand, and 185 mg. of crystals of Antibiotic B-5050-B, on the other hand.

10 g. of Crystal I is dissolved in 50 ml. of ethyl acetate, followed by the addition of 25 ml. of benzene.

The solution is chromatographed on silica gel (400g.) in the same manner as explained above. The column is eluted firstly with 3 L. of ethyl acetate-benzene (1 : 1 by volume), then with ethyl acetate-benzene (2 : 1 by volume). The eluate is fractionated by 500 ml. The fractions obtained by the 1 : 1 mixture contain Antibiotics B-5050-A and -B. The first fraction obtained by the 2 : 1 mixture contain Antibiotics B-5050-B and -C, the second fraction Antibiotics B-5050-C and -D, the third fraction Antibiotics B-5050-D and -E, and the last fraction Antibiotics B-5050-E and F, respectively.

2 g. of the crystals obtained from the fraction containing Antibiotics B-5050-B and -C is again dissolved in 15 ml. of ethyl acetate, followed by the addition of 10 ml of benzene. The solution is subjected to column chromatography with 250 g. of silica gel, and the column is eluted with ethyl acetate-benzene (3 : 2 by volume). The eluate is fractionated by 20 ml. each. The fractions of the same component are combined, concentrated and crystallized from benzene or a mixture of ethyl acetate and n-hexane to give 83 mg. of crystals of Antibiotic B-5050-B, 940 mg. of crystals of Antibiotic B-5050-C and 75 mg. of crystals of Antibiotic B-5050-D.

In the same way, 1.2 g. of the fraction containing Antibiotics B-5050-D and -E is subjected to column chromatography on silica gel, to give 600 mg. of crystals of Aantibiotic B-5050-E.

The fraction, obtained subsequent to the fraction containing Antibiotics B-5050-B and -C, contains Antibiotic B-5050-C as the main ingredient. 770 mg. of the resultant crude crystals are again dissolved in 5 ml. of acetone, and the solution is subjected to column chromatography with 100 g. of silica gel in a similar way to the above explained, whereupon 220 mg. of Antibiotic B-5050 -C is obtained as crystals.

REFERENCE 3

4000 L. of the filtered broth obtained by the main fermentation as described in Reference 2 is adjusted to pH 8.0, and is extracted with its one third volume of ethyl acetate. The ethyl acetate extract is concentrated to about 100 L. The concentrate is washed with 50 L. of water, and extracted three times with 50 L. each of an M/3-aqueous $KH_2PO_4$ solution previously adjusted to pH 3.0 with phosphoric acid. The aqueous extracts are combined, adjusted to a pH of 9 to 10 with an 8N-aqueous ammonia solution, and extracted with 75 L. of ethyl acetate. The ethyl acetate extract is washed three timese with 25 L. each of water, and then concentrated to about 1.5 L. Addition of about 30 L. of n-hexane to the concentrate gives 522 g. of crude powder. Crystallization of the powder from benzene gives 272 g. of crystals of Antibiotic B-5050 mixture.

In the above procedures, the use of a 0.2N-aqueous acetic acid solution in place of the $KH_2PO_4$ solution gives substantially the same result.

19 g. of thus obtained Antibiotic B-5050 mixture is dissolved in 75 ml. of acetone. The solution is subjected to column chromatography with 800 g. of silica gel (Merck A. G., see above). The column is eluted with 3000 ml. of ethyl acetate-benzene (1 : 1 by volume) to give 7.25 g. of crystals consisting mainly of Antibiotics B-5050-A and -B. Then, the column is eluted with ethyl acetate-benzene (2 : 1 by volume). The first fraction eluted with 1100 ml. of the developer is similarly treated to give 2.22 g. of crystals consisting mainly of Antibiotics B-5050-B and -C. The fraction obtained by the subsequent 200 ml. gives 0.90 g. of crystals which consist mainly of Antibiotic B-5050-C. From the further subsequent 300 ml. is obtained 1.4 g. of a mixture consisting mainly of Antibiotics B-5050-C and -D.

From the last 600 ml. fraction is obtained 1.99 g. of crystals consisting mainly of Antibiotics B-5050-D and -E. The column is then eluted with 600 ml. of ethyl acetate-benzene (3 : 1 by volume) to give 0.645 g. of crystals consisting mainly of Antibiotics B-5050-D and -E. From the last fraction eluted with 1600 ml. of ethyl acetate is obtained 2.09 g. of crystals consisting mainly of Antibiotic B-5050-F.

The above obtained Antibiotics B-5050-A and -B crystals (7.25 g.) are dissolved in 40 ml. of acetone, and subjected to column chromatography with 400 g. of silica gel, followed by elution with ethyl acetate-benzene (1 : 1 by volume), whereby 1.5 g. of crystals of Antibiotics B-5050A and 0.65 g. of crystals of Antibiotic B-5050-B are obtained.

The afore-obtained Antibiotics B-5050-B and -C crystals (2.22 g.) are dissolved in 20 ml. of acetone, and column-chromatographed on 300 g. of silica gel, followed by elution with benzene-acetone (3 : 1 by volume) to give 0.398 g. of crystals of B- 5050-B. Further elution with benzene-acetone (2 : 1 by volume) gives 0.269 g. of crystals of Antibiotic B-5050-C.

The crystals consisting mainly of Antibiotic B-5050-C (0.90 g.) are dissolved in 5 ml. of acetone, and column chromatographed on 100 g. of silica gel, followed by elution with ethyl acetate-benzene (2 : 1 by volume), to give 0.258 g. of crystals of Antibiotic B-5050-C.

The Antibiotics B-5050-C and -D crystals (1.40 g.) are dissolved in 10 ml. of acetone, and chromatographed on a column packed with 150 g. of silica gel, followed by elution with benzene-acetone (2 : 1 by volume), to give 0.596 g. of Antibiotic B-5050-C and 0.187 g. of crystals of Antibiotic B-5050-D.

The Antibiotics B-5050-D and -E crystals (1.99 g.) are dissolved in 30 ml. of acetone, and column-chromatographed on 300 g. of silica gel, followed by elution with benzene-acetone (2 : 1 by volume), to give 0.304 g. of crystals of Antibiotic B-5050-D and 0.187 g. of crystals of Antibiotic B-5050-E.

The crystals consisting mainly of Antibiotics B-5050F (2.09 g.) are dissolved in 15 ml. of acetone, and column-chromatographed on 250 g. of silica gel, followed by elution with ethyl acetate-benzene (3 : 1 by volume), to give 0.585 g. of crystals of Antibiotic B-5050-F.

REFERENCE 4

(Preparation of tetrahydro-B-5050)

In 400 ml. of ethanol are dissolved 40 g. crystals of B-5050, and 12 g. of a 10 percent palladium charcoal catalyst (manufactured by Engelhard) is added. Upon this catalytic reduction, about 2 moles of hydrogen is absorbed in 7 hours.

The reaction mixture is filtered to remove the catalyst and, then, concentrated under reduced presssure. To the residue is added n-hexane, whereupon a powdery precipitate is obtained. Yield 36.6 g.

Elementary analysis

| | |
|---|---|
| Calcd. for $C_{41}H_{71}NO_{16}$ | : C, 59.05; H, 8.58; N, 1.68 |
| Found | : C, 58.88; H, 8.72; N, 1.60 |

$[\alpha]_D^{23}$ −57.0° ($c$=1.0 in $CHCl_3$)

REFERENCE 5

(Preparation of α-esters of te trahydro-B-5050)

In 40 ml. of ethanol is dissolved 900 mg. of α-propionyl-B-5050, and 300 mg. of a 10 percent palladium charcoal catalyst (manufactured by Merck) is added. Upon this catalytic reduction, 2 moles of hydrogen is absorbed in about 8 hours. The reaction mixture is filtered to remove the catalyst and the filtrate is concentrated under reduced pressure. The residue is dissolived in benzene, followed by the addition of n-hexane. The procedure yields 465 mg. of α-propionyl tetrahydro-B-5050 in a powdery form.

Elementary analysis

| | |
|---|---|
| Calcd. for $C_{44}H_{75}NO_{17}$ | : C, 59.37; H, 8.49; N, 1.58 |
| Found | : C, 59.05; H, 8.57; N, 1.55 |

$[\alpha]_D^{23}$ −64.4° ($c$=1.0, EtOH)

In the similar manner, the other α-esters of tetrahydro-B-5050 can be also produced.

REFERENCE 6

(Preparation of α,β-diesters of tetrahydro-B-5050)

In 60 ml. of ethanol are dissolved 1.9 g. of α,β-dipropionyl-B-5050, and 600 mg. of a 10 percent palladium-charcoal catalyst is added. Upon catalytic reduction, about 2 moeles of hydrogen is absorbed in about 7 hours. The reaction mixture is filtered and the filtrate is concentrated to dryness under reduced pressure. The residue is dissolved in a small amount of acetone and, with the addition of 10 times its volume of n-hexane, the solution is concentrated under reduced pressure. The procedure yields 1.53 g. of α,β-dipropionyl tetrahydro-B-5050.

Elementary analysis

Calcd. for $C_{47}H_{79}NO_{18}$ : C, 59.68; H, 8.36; N, 1.48
Found : C, 59.98; H, 8.88; N, 1.86

$[\alpha]_D^{23}$ −77.2° (c=0.99, EtOH)

In the similar manner, the other α, β-diesters of tetrahydro-B-5050 can be also produced.

REFERENCE 7

(Preparation of α-esters of tetrahydro-B-5050)

In 40 ml. of ethanol is dissolved 900 mg. of α-propionyl-B-5050, and a catalytic reduction is carried out with hydrogen gas in the presence of 90 mg. platinum oxide. By this procedure, 2 moles of hydrogen is absorbd in about 5 hours and a half.

The reaction mixture is filtered to remove the catalyst and the filtrate is concentrated under reduced pressure. kThe residue is dissolved in a small amount of ether, followed by the addition of n-hexane. The procedure yields 547 mg. of α-propionyl tetrahydro-B-5050 in a powdery form.

REFERENCE 8

(Recovering process of individual ingredients from a reaction product)

1. 450 g. of α-propionate of B-5050 obtained in claim 1 is dissolved in and recrystallized from a mixed solvent of 500 ml. acetone and 1 litre n-hexane to give 73.7 g. of crystals (I). The mother liquid is concentrated. The concentrated is dissolved in 1.8 litre of methanol and kept standing after addition of 1.1 litre water. This procedure yilds 159 g. of crystals (II). Further, the second mother liquid is concentrated, and the concentrate is recrystallized from a mixed solvent of n-hexane and petroleum ether to give 183 g. of powder.

2. 70 g. each of crystals (I) and (II) is dissolved in 300 ml. of benzene and chromatographed on a column packed with 6 kg. of silica gel (Merck, 0.05 – 0.20 mm) in benzene, and eluted by a mixed solvent system of benzene and acetone.

|  | Solvent system benzene:acetone | Volume of eluting solvent(L.) | Ingredient (α-propionate of) | Yield (g) |
| --- | --- | --- | --- | --- |
| Crystals (I) | 5 : 1 | 49.3 | B-5050-B | 4.0 |
|  | 4 : 1 | 26 | -D | 23.5 |
|  | 3 : 1 | 40 | -F | 1.0 |
| Crystals (II) | 5 : 1 | 46.1 | B-5050-A | 15.8 |
|  | 4 : 1 | 22 | -C | 16.2 |
|  | 3 : 1 | 32 | -E | 3.3 |

3. The physicochemical properties of thus obtained ingredients are as follows:

| α-propionate of B-5050 | -F | -E | -D | -C | -B | -A |
| --- | --- | --- | --- | --- | --- | --- |
| m.p.(°C) (decomp.) | 186-9° | 179-81° | 180-3° | 191-3° | 140-2° | 198-201° |
| Solvent for recrystallization | Diethyl ether | Diethyl ether-n-hexane | acetone | Ethyl acetate-n-hexane | Diethyl ether-n-hexane | Diethyl ether |
| $[\alpha]_D^{23}$ in $CHCl_3$ | −67.0 c=0.97 | −63.9 c=1.00 | −64.3 c=0.99 | −61.3 c=1.00 | −66.3 c=1.01 | −62.5 c=1.00 |
| Elementary analysis (calcd.) |  |  |  |  |  |  |
| C | 58.79 | 59.23 | 59.23 | 59.66 | 60.05 | 60.44 |
| H | 7.87 | 7.98 | 7.98 | 8.02 | 8.18 | 8.27 |
| N | 1.63 | 1.61 | 1.61 | 1.58 | 1.56 | 1.53 |
| (found) |  |  |  |  |  |  |
| C | 58.89 | 59.14 | 58.26 | 59.75 | 59.69 | 60.28 |
| H | 8.05 | 7.81 | 7.81 | 8.20 | 8.23 | 8.36 |
| N | 1.49 | 1.59 | 1.51 | 1.57 | 1.31 | 1.40 |
| Chemical formula | $C_{42}H_{67}NO_{17}$ | $C_{43}H_{69}NO_{17}$ | $C_{43}H_{69}NO_{17}$ | $C_{44}H_{71}NO_{17}$ | $C_{45}H_{73}NO_{17}$ | $C_{46}H_{75}NO_{17}$ |

EXAMPLE 1

(Preparation of α-propionate of B-5050)

In 480 parts by volume of pyridine are dissolved 120 parts by weight of crystals of antibiotic B-5050 and 40 parts by volume of propionyl chloride is gradually added under cooling with ice and stirring. The mixture is further stirred at 0° – 5°C for 20 minutes and allowed to stand in a refrigerator for 2 hours. It is then poured into 5000 parts by volume of ice-water and extracted twice with 2500 parts by volume each of ethyl acetate. The ethyl acetate layer is washed with water, 1 percent aqueous solution of sodium bicarbonate and water in the order mentioned, followed by dehydration and concentration under reduced pressure.

The residue is dissolved in 100 parts by volume of acetone, followed by the addition of 5000 parts by volume of petroleum ether, whereupon 108 parts by weight of a white crystalline powder is obtained. This powder is recrystallized from a mixture of acetone and n-hexane.

Elementary analysis
Calcd. for $C_{44}H_{71}NO_{17}$:
C, 59.65; H, 8.08; N, 1.58
Found:
C, 59.39; H, 8.07; N, 1.73
$[\alpha]_D^{23}$ −61.4° ($c$=1.0, $CHCl_3$) −68.6° ($c$=1.0, EtOH)

In the same manner as above except for the esterifying agents employed, the following compounds are obtained.

1. α-acetate of B-5050
Esterifying agent: acetyl chloride
Elementary analysis:
Calcd. for $C_{43}H_{69}NO_{17}$:
C, 59.23; H, 7.98; N, 1.61
Found:
C, 58.94; H, 8.04; N, 1.86
$[\alpha]_D^{23}$ −62.6° ($c$=1, $CHCl_3$)

2. α-n-butyrate of B-5050
Esterifying agent: n-butyryl chloride
Elementary analysis:
Calcd. for $C_{45}H_{73}NO_{17}$:
C, 60.05; H, 8.18; N, 1.56
Found:
C, 60.05; H, 8.15; N, 1.75
$[\alpha]_D^{23}$ −64.3° ($c$=1, $CHCl_3$)

3. α-isobutyrate of B-5050
Esterifying agent: i-butyryl chloride
Elementary analysis:
Calcd. for $C_{45}H_{73}NO_{17}$:
C, 60.05; H, 8.18; N, 1.56
Found:
C, 59.69; H, 8.23; N, 1.57
$[\alpha]_D^{23}$ −62.8 ($c$=1.0, $CHCl_3$)

4. α-n-valerate of B-5050
Esterifying agent: n-valeroyl chloride
Elementary analysis:
Calcd. for $C_{46}H_{75}NO_{17}$:
C, 60.44; H, 8.27; N, 1.53
Found:
C, 60.46; H, 8.37; N, 1.76
$[\alpha]_D^{23}$ −59.9° ($c$=1.0, $CHCl_3$)

5. α-i-valerate of B-5050
Esterifying agent: i-valeroyl chloride
Elementary analysis:
Calcd. for $C_{46}H_{75}NO_{17}$:
C, 60.44; H, 8.27; N, 1.53
Found:
C, 60.38; H, 8.07; N, 1.63
$[\alpha]_D^{23}$ −58.0° ($c$=1, $CHCl_3$)

6. α-acetate of B-5050-A
Esterifying agent: acetyl chloride
Elementary analysis:
Calcd. for $C_{45}H_{73}NO_{17}$:
C, 60.05; H, 8.18; N, 1.56
Found:
C, 59.61; H, 8.48; N, 1.40
$[\alpha]_D^{25}$ −62.5° ($c$=1.0, $CHCl_3$).

7. α-propionate of B-5050-A
Esterifying agent: propionyl chloride
Elementary analysis:
Calcd. for $C_{46}H_{75}NO_{17}$:
C, 60.44; H, 8.27; N, 1.53
Found:
C, 59.80; H, 8.46; N, 1.59
$[\alpha]_D^{23}$ −62.7° ($c$=1.00, $CHCl_3$)

8. α-propionate of B-5050-B
Esterifying agent: propyonyl chloride
Elementary analysis:
Calcd. for $C_{45}H_{73}NO_{17}$:
C, 60.05; H, 8.18; N, 1.56
Found:
C, 59.29; H, 8.17; N, 1.55
$[\alpha]_D^{23}$ −65.8° ($c$=1.0, $CHCl_3$)

9. α-acetate of B-5050-A and -B
Esterifying agent: acetyl chloride
Elementary analysis:
Found:
C, 58.97; H, 8.34; N, 1.67
C, 59.04; H, 8.52; N, 1.65
$[\alpha]_D^{25}$ −63.1° ($c$=1.02, $CHCl_3$)

10. α-propionate of B-5050-A and -B
Esterifying agent: propionyl chloride
Elementary analysis:
Found:
C, 59.54; H, 8.16, N, 1.60
C, 59.58; H, 8.38; N, 1.62
$[\alpha]_D^{23}$ −61.2° ($c$=0.98, $CHCl_3$)

11. α-propionate of B-5050-C
Esterifying agent: propionyl chloride
Elementary analysis:
Calcd. for $C_{44}H_{71}NO_{17}$:
C, 59.66; H, 8.02; N, 1.58
Found:
C, 59.34; H, 8.23; N, 1.59
$[\alpha]_D^{22}$ −60.8° ($c$=0.97, $CHCl_3$)

12. α-acetate of B-5050-C
Esterifying agent: acetyl chloride
Elementary analysis:
Calcd. for $C_{43}H_{69}NO_{17}$:
C, 59.23; H, 7.98; N, 1.61
Found:
C, 59.47; H, 8.09; N, 1.77

EXAMPLE 2

(Preparation of α-crotonate of B-5050)

In the same manner as in Example 1, α-crotonate of B-5050 is obtained.

Elementary analysis
Calcd. for $C_{45}H_{71}NO_{17}$:
C, 60.19; H, 7.97; N, 1.56
Found:
C, 59.81; H, 7.98; N, 1.51
$[\alpha]_D^{23}$ −73.1° ($c$=1.0, $CHCl_3$)

EXAMPLE 3

(Preparation of β-acetate of B-5050)

In 30 parts by volume of acetone is dissolved 5.0 parts by weight of crystals of antibiotic B-5050 followed by the gradual addition of 2 parts by volume of acetic anhydride under cooling with ice and stirring. The mixture is allowed to stand in a refrigerator for 17 hours. The reaction mixture is added to a mixture of 500 parts by volume of 3 percent hydrogen carbonate and 300 parts by volume of ice-water and adjusted to pH 7.5 with an aqueous solution of sodiumhydrogen carbonate. It is then extracted twice with 450 parts by volume each of ethyl acetate. The ethyl acetate solution is washed well with water, dehydrated and concentrated under reduced pressure. The residue is dissolved in a small amount of ethyl acetate, followed by the addition of 90 parts by volume of n-hexane. The procedure yields 4.5 parts by weight of a white crystalline powder.
Elementary analysis
Calcd. for $C_{43}H_{69}NO_{17}$:
C, 59.23; H, 7.98; N, 1.61
Found:
C, 59.01; H, 8.07; N, 1.67
$[\alpha]_D^{23}$ —92.2° (c=1.0, $CHCl_3$)

In the same manner as above, except for the esterifying agent, following compounds are obtainable.
1. β-propionate of B-5050
Esterifying agent: propionic anhydride
Elementary analysis:
Calcd. for $C_{44}H_{71}NO_{17}$:
C, 59.65; H, 8.08; N, 1.58
Found:
C, 59.11; H, 8.22; N, 1.42
$[\alpha]_D^{23}$ —87.0° (c=1.0, $CHCl_3$)
2. β-n-butyrate of B-5050
Esterifying agent: n-butyric anhydride
Elementary analysis:
Calcd. for $C_{45}H_{73}NO_{17}$:
C, 60.05; H, 8.18; N, 1.56
Found:
C, 59.89; H, 8.74; N, 1.40
$[\alpha]_D^{25}$ —90.9° (c=1, $CHCl_3$)
3. β-i-valerate of B-5050
Esterifying agent: i-valaric anhydride
Elementary analysis
Calcd. for $C_{46}H_{75}NO_{17}$:
C, 60.44; H, 8.27; N, 1.53
Found:
C, 59.76; H, 8.27; N, 1.49
$[\alpha]_D^{23}$ —89.2° (=1, $CHCl_3$)
4. β-acetate of B-5050-A and -B
Esterifying agent: acetic anhydride
Elementary analysis
Found:
C, 58.211; H, 8.07; N, 1.37;
C, 58.42; H, 8.11; N, 1.50
$[\alpha]_D^{23}$ —84.3° (c=1.0, EtOH)
5. β-acetate of B-5050-A
Esterifying agent: acetic anhydride
Elementary analysis
Calcd. for $C_{45}H_{73}NO_{17}$:
C, 60.05; H, 8.18; N, 1.56
Found:
C, 59.76; H, 8.32; N, 1.52
$[\alpha]_D^{24}$ —91.3° (c=1.0, EtOH)
6. β-propionate of B-5050-C
Esterifying agent: propionic anhydride
Elementary analysis:
Calcd. for $C_{44}H_{71}NO_{17}$:
C, 59.66; H, 8.02 N, 1.58 Found:
C, 58.82; H, 8.81; N, 1.60
C, 58.85; H, 8.66; N, 1.95
$[\alpha]_D^{23}$ —93.5° (c=1.02, EtOH)
7. β-acetate of B-5050-C
Esterifying agent: acetic anhydride
Elementary analysis:
Calcd. for $C_{43}H_{69}NO_{17}$
C, 59.23; H, 7.98; N, 1.61
Found:
C, 58.88; H, 8.12; N, 1.66
$[\alpha]_D^{23}$ —90.6° (c=1, $CHCl_3$)

EXAMPLE 4

(Preparation of β-succinate of B-5050)

In 4 parts by volume of acetone are dissolved 0.5 part by weight of crystals of antibiotic B-5050, followed by the gradual addition of 0.175 part by weight of succinic anhydride at room temperature with stirring. The mixture is stirred at room temperature for 5 hours and concentrated under reduced pressure. The residue is extracted with 150 parts by volume of ethyl acetate and the extract is washed well with water, dehydrated, concentrated and allowed to stand. The resulting crystals are recovered by filtration and washed with ethyl acetate and ether. Yield 0.375 part by weight.
Elementary analysis
Calcd. for $C_{45}H_{71}NO_{19} \cdot CH_3COOC_2H_5 \cdot H_2O$:
C, 56.81; H, 7.83; N, 1.35
Found:
C, 57.15; H, 7.92; N, 1.55
$[\alpha]_D^{26}$ —81.7° (c=1, $CHCl_3$)

EXAMPLE 5

In 5 parts by volume of pyridine is dissolved 0.9 part by weight of crystals of antibiotic B-5050 and while the solution is cooled with ice-water, 0.4 part by weight of succinic anhydride is gradually added.

The mixture is allowed to stand at room temperature for 16 hours, at the end of which time 200 parts by volume of ice-water is added. The mixture is extracted three times with 100 parts by volume each of ethyl acetate, washed with water, dehydrated and concentrated under reduced pressure. The residue is dissolved in 10 parts by volume of ethyl acetate-chloroform (1:1), followed by the addition of 100 parts by volume of N-hexane. The procedure yields 0.704 part by weight of a crystalline powder. The characteristics of this powder are in accord with those of the sample obtained in Example 4.

In the same manner as above, except for the esterifying agents, the following compounds are obtainable:
β-benzoate of B-5050
Esterifying agent: benzoic anhydride
Elementary analysis:
Calcd. for $C_{48}H_{71}NO_{17}$:
C, 61.72, H, 7.66; N, 1.50
Found: C, 61.55; H, 7.59; N, 1.45
$\lambda_{max}^{MeOH}$ 230 mμ (ε13,600)
$[\alpha]_D^{23}$ —76.7° (c=1.0, $CHCl_3$)

EXAMPLE 6

(Preparation of α,β-diacetate of B-5050)

In 10 parts by volume of pyridine are dissolved 5.0 parts by weight of crystals of antibiotic B-5050 and, at room temperature and under stirring, 5.0 parts by volume of acetic anhydride is added. The mixture is allowed to stand for 15 hours, at the end of which time it is poured into 300 parts by volume of ice-water. The resulting precipitate is recovered by filtration and washed with water. The mother fluid is combined with the washing and the pool is extracted twice with 200 parts by volume each of ethyl acetate. The extract is washed with water, a 2N-aqeuous solution of sodium bicarbonate and water in the order mentioned, dehydrated and concentrated under reduced pressure. The precipitate previously recovered is dissolved in methylene chloride and the solution is dehydrated and concentrated under reduced pressure. The two concentrates are combined and recrystallized from methylene chloride-n-hexane, acetone-n-hexane or methylene chloride-n-hexane-petroleum ether. The procedure yields 4.65 parts by weight of B-5050 α,β-diacetate. m.p.127° – 132°C (decomp.)

Elementary analysis:
Calcd. for $C_{45}H_{71}NO_{18}$:
C, 59.13; H, 7.83; N, 1.50
Found:
C, 59.25; H, 7.93; N, 1.49
$[\alpha]_D^{23}$ −84.9° (c=1, CHCl$_3$)

In the same manner as above, except for the esterifying agent, the following compounds are obtained:

1. α,β-dipropionate of B-5050
Esterifying agent: propionic anhydride M.P. 132°C (decom.)
Elementary analysis:
Calcd. for $C_{47}H_{75}HO_{18}$:
C, 59.92; H, 8.02; N, 1.49
Found:
C, 60.01; H, 8.31; N, 1.46
$[\alpha]_D^{23}$ −81.7° (c=1.0, CHCl$_3$)

2. α, β-dicrotonate of B-5050
Esterifying agent: crotonic anhydride
Elementary analysis:
Calcd. for $C_{49}H_{75}NO_{18}$:
C, 60.92; H, 7.82; N, 1.45
Found:
C, 60.55; H, 7.76; N, 1.41
$[\alpha]_D^{23}$ −92.0° (c=1, CHCl$_3$)

3. α,β-di-n-butyrate of B-5050
Esterifying agent: n-butyric anhydride
Elementary analysis:
Calcd. for $C_{49}H_{79}NO_{18}$:
C, 60.66; H, 8.21; N, 1.44
Found:
C, 60.37; H, 8.30; N, 1.53
$[\alpha]_D^{23}$ −74.9° (c=1.0, CHCl$_3$)

4. α,β-diacetate of B-5050-A and -B
Esterifying agent: acetic anhydride M.P. 131°–135°C (Decomp.)
Elementary analysis:
Found:
C, 59.01; H, 8.05; N, 1.58
C, 59.26; H, 7.91; N, 1.68
$[\alpha]_D^{23}$ −83.7° (c=1, CHCl$_3$)

5. α,β-dipropionate of B-5050-A, -B
Esterifying agent: propionic anhydride
M.P. 104°–107°C (decomp.)
Elementary analysis:
Found:
C, 60.09; H, 8.24 N, 1.45
C, 60.26; H, 8.32; N, 1.63
$[\alpha]_D^{23}$ −70.7° (c=1.0, CHCl$_3$)

6. α,β-diacetate of B-5050-A
Esterifying agent: acetic anhydride
Elementary analysis:
Calcd. for $C_{47}H_{75}NO_{18}$:
C, 59.92; H, 8.02; N, 1.49
Found:
C, 59.49; H, 8.21; N, 1.62
$[\alpha]_D^{22}$ −77.4° (c=1, EtOH)

7. α, β-dipropionate of B-5050-A
Esterifying agent: propionic anhydride
Elementary analysis:
Calcd. for $C_{49}H_{79}NO_{18}$:
C, 60.66; H, 8.21; N, 1.44
Found:
C, 60.48; H, 8.34; N, 1.51
$[\alpha]_D^{22}$ −83.2° (c=1.02, EtOH)

8. α, β-diacetate of D-5050-B
Esterifying agent: acetic anhydride
Elementary analysis:
Calcd. for $C_{46}H_{73}NO_{18}$:
C, 59.53; H, 7.93; N, 1.51
Found:
C, 59.47; H, 8.10; N, 1.51

9. α, β-diacetate of B-5050-C
Esterifying agent: acetic anhydride
elementary analysis:
Calcd. for $C_{45}H_{71}NO_{18}$:
C, 59.13; H, 7.48; N, 1.53
Found:
C, 58.89; H, 8.10; N, 1.67
C, 59.02; H, 8.07; N, 1.57
$[\alpha]_D^{23}$ −81.5° (c=1, CHCl$_3$)

10. α, β-dipropionate of B-5050-C
Esterifying agent: propionic anhydride
Elementary analysis:
Calcd. for $C_{47}H_{75}NO_{18}$:
C, 59.92; H, 8.02; N, 1.49
Found:
C, 59.54; H, 8.20; N, 1.50
$[\alpha]_D^{23}$ −86.9° (c=1.01, CHCl$_3$).

EXAMPLE 7

(Preparation of a α-acetyl-β-monopropionate of B-5050)

In 12 parts by volume of pyridine is dissolved 6.0 parts by weight of the antibiotic B-5050 β-propionate at room temperature and under cooling, 1.5 parts by volume of acetic anhydride is added. The mixture is allowed to stand for 14 hours, at the end of which time it is poured into 500 parts by volume of ice-water. The resulting precipitate is recovered by filtration and washed with water. The mother fluid is combined with the washing and the pool is extracted twice with 200 parts by volume each of ethyl acetate. The precipitate is combined with the above extract and the pool is concentrated under reduced pressure, followed by the addition of 300 parts by volume of n-hexane. The procedure yields 5.45 parts by weight of a crystalline powder.

Elementary analysis:
Calcd. for $C_{46}H_{73}NO_{18}$:
C, 59.53; H, 7.93; N, 1.51
Found:
C, 58.84; H, 7.85; N, 1.57
$[\alpha]_D^{23}$ −82.3° (c=1, CHCl$_3$)

EXAMPLE 8

(Preparation of α-propionyl-β-acetate of B-5050)

In 10 parts by volume of pyridine is dissolved 2.0 parts by weight of the antibiotic α-propionate of B-5050 and, at room temperature and under stirring, 5 parts by volume of acetic anhydride is added. The mixture is allowed to stand for 15 hours, at the end of which time it is poured into 300 parts by volume of ice-water. The resulting precipitate is recovered by filtration and washed with water. It is dissolved in 100 parts by volume of ethyl acetate and the solution is dehydrated and concentrated under reduced pressure, followed by the addition of petroleum ether. The procedure yields 1.8 parts by weight of a crystalline powder.

Elementary analysis:
Calcd. for $C_{46}H_{73}NO_{18}$:
C, 59.53; H, 7.93; N, 1.51
Found:
C, 59.58; H, 7.92; N, 1.51
$[\alpha]_D^{23}$ −82.8° ($c$=1, $CHCl_3$)

EXAMPLE 9

(Production of β-acetate of tetrahydro-B-5050)

In 1.2 part by volume of acetone is dissolved 0.2 part by weight of tetrahydro-B-5050 and with the addition of 0.1 part by volume of acetic hydride, the solution is stirred at 0°C. The mixture is held at 0°C for 18 hours, at the end of which time it is poured into 50 parts by volume of ice-water. After being adjusted to pH 8.0 with 5 percent sodium hydrogen carbonate, the mixture is extracted twice with 20 parts by volume each of ethyl acetate. The extracts are pooled, washed with water, dehydrated and concentrated under reduced pressure. To the residue is added n-hexane, whereupon 0.161 part by weight of β-acetyl tetrahydro-B-5050is obtained as a powder.

Elementary analysis:

| | | | |
|---|---|---|---|
| Calcd. for $C_{43}H_{73}NO_{17}$ | C, 58.97; | H, 8.34; | N, 1.60 |
| Found | : C, 58.62; | H, 8.34; | N,1.59 |
| | 58.57 | 8.46 | 1.53 |

$[\alpha]_D^{23}$ −68.2° ($c$=1 in EtOH)

In the same manner as above, except for the esterifying agent, β-propionate of tetrahydro-B-5050 is obtained:
Esterifying agent: propionic anhydride
Elementary analysis:
Calcd. for $C_{44}H_{75}NO_{17}$:
C, 59.37; H, 8.49; N, 1.57
Found:
C, 59.48; H, 8.59; N, 1.39
$[\alpha]_D^{23}$ −76.2° ($c$=1 in EtOH)

EXAMPLE 10

(α,γ-dipropionate of tetrahydro-B-5050)

In 20 parts by volume of pyridine is dissolved 5.0 parts by weight of tetrahydro-B-5050 and with the addition of 2.0 parts by volume of propionyl chloride, the solution is stirred at 0°C. The mixture is allowed to stand for 2 hours, at the end of which time it is poured into 500 parts by volume of ice-water. The mixture is extracted twice with 250 parts by volume of ethyl acetate, and the extracts are pooled and washed with water, a 5 percent aqueous solution of sodium bicarbonate and water in the order mentioned, followed by dehydration and concentration under reduced pressure.

To the concentrate is added n-hexane-petroleum ether, whereupon α,γ-dipropionyl of tetrahydro-B-5050 is obtained as powder. Yield 3.0 parts by weight.

Elementary analysis:
Calcd. for $C_{47}H_{79}NO_{18}$:
C, 59.66; H, 8.42; N, 1.45
Found:
C, 58.96; H, 8.40; N, 1.82
$[\alpha]_D^{23}$ −53.5° ($c$=1.0 in $CHCl_3$)

In the same manner as above, except for the esterifying agent, α,γ-di-n-butyrate of tetrahydro-B-5050 is obtained:
Esterifying agent: n-butyryl chloride
Elementary analysis:
Calcd. for $C_{49}H_{83}NO_{18}$:
C, 60.41; H, 8.59; N, 1.44
Found:
C, 60.62; H, 8.49; N, 1.50
$[\alpha]_D^{23}$ −52.9° ($c$=1.0 in $CHCl_3$)

EXAMPLE 11

(α,β,γ-triacetate of tetrahydro-B-5050)

In 30 parts by volume of pyridine is dissolved 8.0 parts by weight of tetrahydro-B-5050, and while the solution is stirred at room temperature, 15 parts by volume of acetic anhydride is added. The mixture is allowed to stand for 15 hours. The reaction mixture is poured into 800 parts by volume of ice-water and extracted twice with 270 parts by volume each of ethyl acetate. The ethyl acetate layer are pooled, washed with water, a 5 percent aqueous solution of sodium hydrogen carbonate and water in the order mentioned, dehydrated and concentrated under reduced pressure to about 200 parts by volume. Then, 8.0 parts by weight of chromatographic activated carbon is added, and after the mixture is heated to a moderate temperature, it is filtered and the filtrate concentrated.

To the concentrate is added a mixture of methylene chloride and n-hexane, whereupon 4.2 parts by weight of α,β,γ-triacetate of tetrahydro-B-5050 is obtained as colorless prisms. Upon addition of petroleum ether to the mother fluid, 2.5 parts by weight of powder is further obtained. m.p. 110°-113° (decomp.)

Elementary analysis:
Calcd. for $C_{47}H_{77}NO_{19}$:
C, 58.80; H, 8.08; N, 1.46
Found:
C, 58.33; H, 8.08; N, 1.49
$[\alpha]_D^{23}$ −76.3° ($c$=1.0 in $CHCl_3$)

In the same manner as above, except for the esterifying agent, α,β,γ-tripropionate of tetrahydro-B-5050 is obtained. m.p.118°-122°C.(decomp.)
Esterifying agent: propionic anhydride
Elementary analysis:
Calcd. for $C_{50}H_{83}NO_{19}$:
C, 59.92; H, 8.35; N, 1.40
Found:
C, 60.24; H, 8.54; N, 1.35
$[\alpha]_D^{23}$ −70.1° ($c$=1.0 in $CHCl_3$)

EXAMPLE 12

(Production of α,β,γ-tripropionate of tetrahydro-B-5050)

In 4 parts by volume of pyridine is dissolved 1 part by weight of β-propionate of tetrahydro-B-5050 and, under cooling with icewater, 1 part by volume of propionic anhydride is added dropwise. The mixture is allowed to stand at room temperature for 20 hours and then poured into 150 parts by volume of ice-water and the resulting precipitate is recovered by filtration, washed with water and dried. Yield 1.04 part by weight.

Elementary analysis:
Calcd. for $C_{50}H_{83}NO_{19}$:
C, 59.92; H, 8.35; N, 1.40
Found:

21

C, 59.66; H, 8.42; N, 1.51
[α]$_D^{23}$ −73.1° (c=1.0, CHCl$_3$)

EXAMPLE 13

(Production of α,β,γ-triacetate of tetrahydro-B-5050)

In 3 parts by volume of pyridine is dissolved 0.3 part by weight of α,β-diacetate of tetrahydro-B-5050 and under cooling with ice-water, 0.3 part by volume of acetic anhydride is added dropwise. The mixture is allowed to stand at room temperature for 20 hours and then poured into 80 parts by volume of ice-water and the resulting precipitate is recovered by filtration, washed with water and dried. Yield 0.25 part by weight.

Elementary analysis:
Calcd. for C$_{47}$H$_{77}$NO$_{19}$:
 C, 58.80; H, 8.08; N, 1.46
Found:
 C, 58.45; H, 8.26; N, 1.43
[α]$_D^{23}$ −74.9° (c=1, in CHCl$_3$)

In the same manner, α,β,γ-triacetate of tetrahydro-B-5050 is also obtained by the esterification of α,γ-diacetate of tetrahydro-B-5050.

EXAMPLE 14

(α,β,γ-tripropionate of tetrahydro-B-5050)

In 2 parts by volume of pyridine is dissolved 0.3 part by weight of α-propionate of tetrahydro-B-5050 and, under cooling with ice, 0.3 part by volume of propionic anhydride is added dropwise, with stirring. The mixture is allowed to stand at room temperature for 20 hours. The reaction mixture is poured into 100 parts by volume of icewater and the resulting precipitate is recovered by filtration, washed with water and dried. The procedure yields 0.25 part by weight of α,β,γ-tripropionate of tetrahydro-B-5050 as powder. The Rf value (TLC on silica gel) and other characteristics of this product are in accord with those of the α,β,γ-tripropionate of tetrahydro-B-5050 sample obtained in Example 11.

EXAMPLE 15

(Production of α,β-dipropionate of tetrahydro-B-5050)

In 30 parts by volume of acetone is dissolved 5 parts by weight of α-propionate of tetrahydro-B-5050 and, under cooling with ice-water 2 parts by volume of propionic anhydride is added dropwise. The mixture is allowed to stand in a refrigerater for 18 hours and poured into 100 parts by volume of a 2 percent aqueous solution of sodium bicarbonate and the resulting precipitates are extracted twice with ethyl acetate, washed, dehydrated and concentrated under reduced pressure. To the resulting syruppy substance is added 200 parts by volume of n-hexane to give 4.6 parts by weight of white powder.

Elementary analysis:
Calcd. for C$_{47}$H$_{79}$NO$_{18}$:
 C, 59.66; H, 8.42; N, 1.45
Found:
 C, 59.38; H, 8.29; N, 1.36
[α]$_D^{23}$ −78.5° (c=1, CHCl$_3$)

EXAMPLE 16

(Production of α,γ-dipropionate of tetrahydro-B-5050)

In 15 parts by volume of pyridine is dissolved 3 parts by weight of α-propionate of tetrahydro-B-5050 and under cooling with ice-water, 1.0 part by volume of propionyl chloride is added and stirred for 2 hours. The reaction mixture is poured into 300 parts by volume of ice water and the whole is extracted twice with 300 parts by volume each of ethylacetate. The combined extract is washed twice with an 5 percent aqueous solution of sodium bicarbonate, washed, dehydrated and concentrated under reduced pressure and then n-hexane is added to give α,γ-dipropionate of tetrahydro-B-5050 as powder. Yield 2.4 parts by weight.

Elementary analysis:
Calcd. for C$_{47}$H$_{79}$NO$_{18}$:
 C, 59.66; H, 8.42; N, 1.45
Found:
 C, 59.41; H, 8.53; H, 1.47
[α]$_D^{23}$ −54.7° (c=1.0, CHCl$_3$)

What is claimed is:

1. An ester of a carboxylic acid of 1 to 10 carbon atoms, which is selected from the group consisting of 9-, 2'- and 9, 2'-ester of (I)

wherein R$_1$ is propionyl or acetyl and R$_2$ is i-valeryl, propionyl or acetyl.

2. A compound claimed in claim 1, namely, 9-acetate of the compound of formula I.

3. A compound claimed in claim 1, namely, 9-propionate of the compound of formula I.

4. A compound claimed in claim 1, namely, 9-n-butyrate of the compound of formula I.

5. A compound claimed in claim 1, namely, 9-i-butyrate of the compound of formula I.

6. A compound claimed in claim 1, namely, 9-crotonate of the compound of formula I.

7. A compound claimed in claim 1, namely, 2'-acetate of the compound of formula I.

8. A compound claim in claim 1, namely, 2'-propionate of the compound of formula I.

9. A compound claimed in claim 1, namely, 9,2'-diacetate of the compound of formula I.

10. A compound claimed in claim 1, namely, 9-propionyl-2'-acetate of the compound of formula I.

11. A compound claimed in claim 1, namely, 9,2'-dipropionate of the compound of formula I.

12. A compound claimed in claim 1, namely, the 9-propionate of the compound of formula I wherein both R$_1$ and R$_2$ are propionyl.

13. An ester of a carboxylic acid of 1 to 10 carbon atoms, which is selected from the group consisting of 2'-, 9,2'-, 9,13-, and 9,2',13-ester of (II)

wherein $R_1$ is propionyl or acetyl and $R_2$ is i-valeryl, propionyl or acetyl.

14. A compound claimed in claim 13, namely, 9,2',13-triacetate of the compound of formula II.

15. A compound claimed in claim 13, namely, 9,2',13-tripropionate of the compound of formula II.

16. A compound as claimed in claim 1, namely, the 9-propionate of the compound of formula (I) wherein $R_1$ is propionyl and $R_2$ is i-valeryl.

17. A compound as claimed in claim 1, namely, the 9-propionate of the compound of formula (I) wherein $R_1$ is acetyl and $R_2$ is propionyl.

* * * * *